United States Patent [19]

Salcedo

[11] 3,768,717

[45] Oct. 30, 1973

[54] SPRING BIASED TAPE GUIDE WITH MEANS FOR DISTRIBUTING TAPE EDGE FORCES ALONG THE TAPE LENGTH

[75] Inventor: Guido Salcedo, Milpitas, Calif.

[73] Assignee: Echo Sciene Corporation, Mountain View, Calif.

[22] Filed: Feb. 7, 1972

[21] Appl. No.: 223,912

[52] U.S. Cl. .................................... 226/198, 242/76
[51] Int. Cl. .............................................. B65h 27/00
[58] Field of Search ......................... 242/76; 226/198

[56] References Cited

UNITED STATES PATENTS

| | | | |
|---|---|---|---|
| 3,347,437 | 10/1967 | Rush | 226/198 |
| 3,276,651 | 10/1966 | Bryer | 226/190 |
| 3,443,273 | 5/1969 | Arch | 226/198 X |
| 3,375,963 | 4/1968 | Wang | 226/198 X |

FOREIGN PATENTS OR APPLICATIONS

| | | | |
|---|---|---|---|
| 1,165,696 | 10/1969 | Great Britain | 242/76 |

*Primary Examiner*—George F. Mautz
*Assistant Examiner*—Edward J. McCarthy
*Attorney*—Jerald E. Rosenblum

[57] ABSTRACT

A guide for tape wherein edgewise force, responsive to irregularities in tape width, is exerted and distributed on tape wrapped about the guide. The force is derived from a spring biased disk pushing against an unsupported tape edge in a manner wherein long tape edge segments of wider than average width receive a distributed force along the tape edge in contact with the disk.

2 Claims, 3 Drawing Figures

SPRING BIASED TAPE GUIDE WITH MEANS FOR DISTRIBUTING TAPE EDGE FORCES ALONG THE TAPE LENGTH

BACKGROUND OF THE INVENTION

The invention relates to apparatus for positioning recording tape and the like and, more particularly, to apparatus for accurately positioning tape which may be rapidly moving in a tape recorder or similar apparatus.

Previously, various tape guides and gates have been used to position tape in a recording or playback apparatus. The general problem which arises is that information encoded on magnetic tape is usually very closely spaced so that it is important to reliably present the same tape segment to a reproduce tape head as was presented to a record head, or vice versa.

Prior art devices aimed at solving this problem usually employ a reference surface to support a first edge of the tape, a tape backing surface to support most of the tape width and a means to exert force on an unsupported segment of a second tape edge. Such a device is usually a cylindrical apparatus positioned near a tape head.

Tape, no matter how accurately made, is irregular in width. The irregularities usually only amount to a few thousandths of an inch and extend for many feet; nevertheless, even these small distances affect recorder performance. Prior tape guides fail to properly take account of tape irregularities. This failure is manifested by the tendency of prior art devices to exert extra force against tapes having wider than normal segments. Such extra force tends to make the tape convex against the tape backing surface with the possibility that the tape might depart slightly from the tape reference surface thereby defeating the purpose of the tape guide. To preclude such a possibility, some prior art devices employ vacuum against the back of the tape to keep it positioned against the guides, an expensive and undesirable procedure. Even if the tape does not buckle, accelerated wear is created by the extra force on unsupported portions of wider tape segments, causing them to bend or tuck in, thereby adversely affecting tape performance. Usually the extra force is derived from spring forces which tend to increase as the spring is compressed, e.g., by tape segments of increased width.

SUMMARY OF THE INVENTION

The object of the invention is to provide a single tape guide which minimizes damage to tape edges. This object is achieved by evenly distributing forces along tape edge segments when increased forces are used to maintain tape in a desired position in a tape guide.

Basically, the tape guide of the present invention includes a tape reference surface for referencing a first tape edge and a cylindrical tape-backing member to support most of the width of a standard size tape excepting a region adjacent the second tape edge to which force is applied by a spring means. Standard size tape varies slightly in width and extra wide tape segments push against the spring means thereby meeting a reactive force of increased magnitude. The spring means is constructed in two pieces, the first of which is a spring biasing the second member, a disk or washer connected adjacent to the cylinder and a similar radius of curvature. These act as a force-distributing mechanism to the second tape edge surface when the tape is wrapped partially about the tape guide in a position for edge contact with the disk or washer.

The disk which applies force to the tape has force applied to it by a biasing spring, termed a spring means. Both the disk and spring means are of low mass, i.e., less than one half gram each, so that high inertial forces will not occur when the system is rapidly accelerated, as in a rocket.

The force distributing feature of the invention is activated by long tape segments of increased width which occupy a large angular section abutting the disk. Contact with the large angular disk section spreads forces transmitted through the disk along the continuous tape edge beneath the disk thereby limiting the force per unit edge length of the tape.

DESCRIPTION OF A PREFERRED EMBODIMENT

Figure 1:
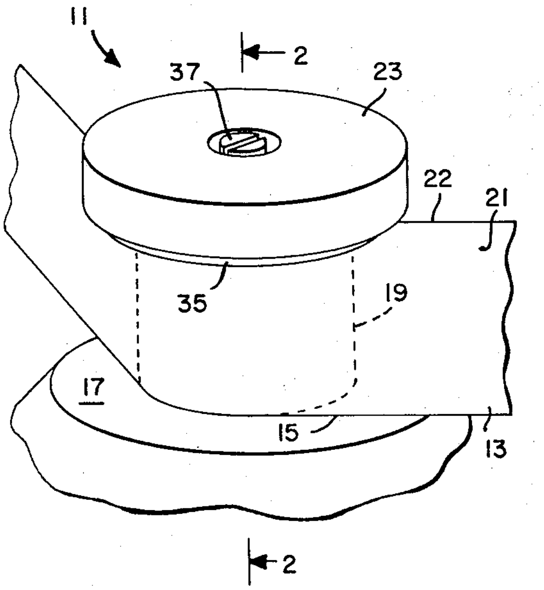
FIG. 1 is a perspective view of the apparatus of the present invention.

The perspective view of the apparatus of the present invention in FIG. 1 shows a tape guide 11 positioning a segment of magnetic tape 13. A lower edge 15 of tape 13 is referenced against the substantially flat reference surface 17. Most of the width of tape 13 rests against a tape backing member 19 except for the region 21 adjacent the second edge 22 of the tape which extends beyond the width of the tape backing member 19. An end cap 23 covers a spring means for distributing forces along the region 21 adjacent the second edge of the tape 13.

Figure 2:
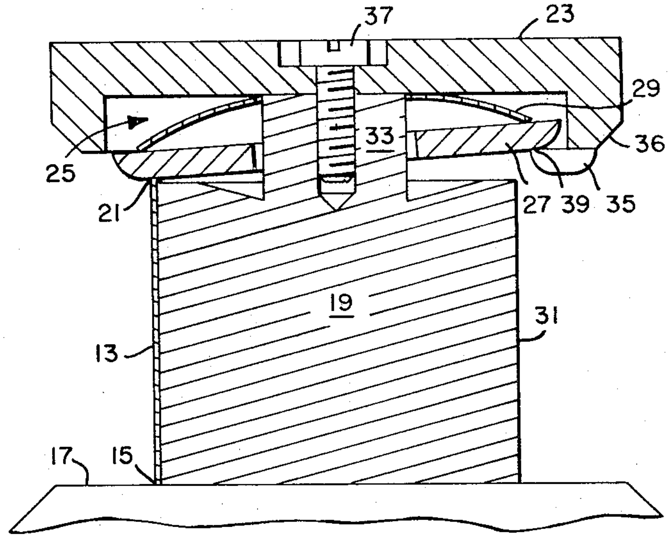
FIG. 2 is a sectional view of the apparatus of FIG. 1 taken along the line 2—2.

Further constructional details of the apparatus are apparent in FIG. 2. The region 21 adjacent the second edge of tape 13 is shown to be in an abutting relationship to the spring means 25. The spring means 25 bears against the region 21 inwardly toward the reference surface 17.

It will be seen that spring means 25 is a spring biased mass which includes two principal portions: a discoidal mass 27 with a plane nearly perpendicular to the tape width and which defines an aperture through the center thereof, thereby resembling a washer and a discoidal spring 29 which is generally coaxial with the discoidal mass, resembling a bent washer, and in contact with the mass 27, concavely facing said mass and the tape 13. Note that the mass 27 need not be perpendicular to the tape width as long as a substantial component of force is transmitted through the tape toward reference surface 17. The region 21 adjacent the second edge of tape 13 extends slightly above the support surface of the tape backing member 19. Thus, the discoidal mass 27 backed by the spring 29 exerts a force on the region 21 adjacent the second edge of tape 13. This force keeps tape 13 referenced against the reference surface 17 and in the desired position for use in a tape recorder of similar apparatus.

Tape backing member 19 includes contiguous upper and lower cylindrical portions. One portion is lower cylinder 31, the other portion is upper cylinder 33, both of which are coaxial with each other and extending upwardly from the reference surface 17. For the sake of convenience, the terms "upper", "lower", "top", "bottom", etc., are used in the specification and claims in a relative sense only, it being apparent that devices in accord with the present invention may be used in any desired orientation. Furthermore, the term "cylinder" includes not only circular cylinders, but any curved surface having an altitudinal dimension as well, e.g., elliptical cylinders. It will also be noted that while the tape backing member 19 is shown to be solid, this member may also be hollow where low mass is an objective. In any event, it will be noted that the upper cylinder 33 is of substantially lesser diameter than the lower cylinder 31 and hence the upper tape backing portion is constricted with respect to the lower portion so that the upper cylinder will avoid contact with tape 13. Upper cylinder 33 provides a means for suporting the spring means 25 principally through suspension from end cap 23.

The discoidal mass 27 defines an aperture through the center thereof of greater diameter than the diameter of the upper cylinder 33 so that the mass may be disposed surrounding the upper cylinder. The end cap 23 is designed to be attached to the upper cylinder 33 at a location remote from the tape reference surface 17. The end cap has an inwardly and downwardly extending lip 35, a portion of which acts as a fulcrum 39 for the mass 27. Lip 35 may be formed by attaching a pinhead or similar member to the downwardly extending rim 36 of end cap 23.

While a first segment of the discoidal mass 27 abuts a first segment of the region 21 adjacent the second edge of the tape 13, a second segment of the discoidal mass, diametrically opposite the first segment resting on the tape is pivoted from the fulcrum 39 formed by a point near the inward edge of lip 35 for allowing the first disk segment to contact pivotally the region 21 adjacent the second edge of the tape.

The discoidal mass 27 is equal in mass to almost half a gram, so that by itself, it would exert a gravitational force on the tape when the mass is above the tape. To assure that a positive force exists for the tape guide 11 regardless of orientation, the spring means 25 includes a biasing spring 29 which is a concavely discoidal spring generally coaxial with the discoidal mass 27. The discoidal spring 29 has a mass of from a few miligrams up to half a gram, but exerts a force against the mass 27 from approximately 10 to 15 grams. The screw 37 secures end cap 23 and spring 29 in place through upper cylinder 33 so that the end cap can securely support the mass 27.

While the materials used in construction of the present tape guide are not critical, the spring 29 should be made of a stiff resilient material, such as spring steel, with ends contacting the mass 27 which are chamfered or made smooth for low friction contact with the mass 27. The mass 27 should be made of a material which will avoid accumulation of particulate matter from contact with the tape. Such a material will have to be selected depending on the characteristics of the tape material.

Figure 3:
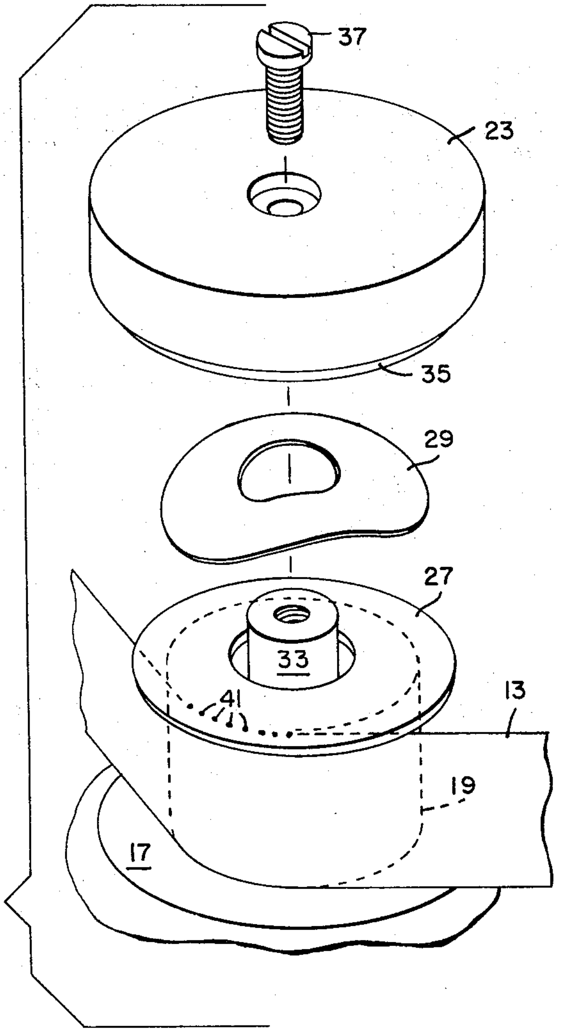
FIG. 3 is operational exploded view of the apparatus of FIG. 1.

The force distribution operation of the present invention will be understood with reference to FIG. 3. Magnetic tape, even of the highest quality, has irregularities in width. For example, in the U.S. video recording industry, magnetic tape has a maximum width of 1.000 inch and a minimum width of 0.996 inch. The average tape width is therefore somewhere between the aforementioned two dimensions. In accordance with the teachings of the present invention, the lower cylinder 31 is made slightly less than the minimum tape width, or approximately 0.994 inch, when working with the 1-inch maximum video tape mentioned above. This means that there is always an unsupported tape width at the region 21 adjacent the second tape edge 22 amounting to at least 0.002 inch.

It often happens that tape 13 has a long segment of wider than average tape which will cause mass 27 to pivot upwardly and incur the maximum resistive opposing force from the spring and mass combination, 29, 27, respectively. Since the tape backing portion consisting of lower cylinder 31 and the mass 27 are rounded, the aforementioned wide tape segment abuts the mass 27 along a relatively long, curved trajectory indicated by the beaded line 41 in FIG. 3. Thus, the force applied to the tape by the spring 29 and mass 27 is generally uniformly distributed over a long, curved tape edge segment, thereby limiting the force per unit length along the second edge of the tape wrapped about the guide.

In the above example, wherein the lower cylinder 31 was 0.994 inch, it will be realized that for standard U.S. tape the maximum unsupported tape width is 0.006 inch.

When tape is made at the maximum width, such a width persists for many, many feet with a gradual change toward a lesser dimension. Such a width will incur the maximum force by the spring means 25 on the unsupported tape wrapped about the tape guide. However, because the discoidal mass 27 is pivoted onto the upper tape edge 22 and contacts the tape in those regions where the tape is curved in passing around the tape guide, the maximum force will be distributed generally uniformly along unit lengths of the tape edge segments in contact with the discoidal mass 27. The net effect of this action is that relatively wide, unsupported tape widths, here 0.006 inch, will not tend to bend or wear as rapidly as in prior art devices.

It will be noted that the discoidal mass 27 has a greater contact segment with wider tape portions than with narrower portions. This occurs because the mass 27 is lifted by wider portions so that almost the entire tape second edge portion of curvature about the tape guide is in contact with the mass. This permits a maximum force distribution on the unsupported tape edge for wide tape segments.

While this invention has been described with particular reference to the illustrated embodiments, it should be understood that those embodiments are illustrative only, and the scope of this invention should not be limited except in accordance with the following claims.

I claim:

1. An improved cylindrical tape guide of the type including a first tape edge reference surface against which a first tape edge abuts, a tape backing member having contiguous upper and lower cylinders connected to the reference surface with one of said cylinders having a lesser diameter than the other, said tape backing member having a dimension backing the tape width exclusive of an unsupported region adjacent the second tape edge wherein the improvement comprises a spring biased disk mass defining an aperture therethrough of sufficient diameter to encircle the cylinder of lesser diameter of said upper and lower cylinders, said mass having a first segment bearing against the second tape edge towards said reference surface, and an end cap attached to said cylinder of lesser diameter remote from the tape reference surface, said end cap having a fulcrum upon which a second segment of said disk, diametrically opposite said first segment, is pivoted for allowing said first disk segment to contact the unsupported second tape edge where said tape is wrapped about the guide.

2. An improved cylindrical tape guide of the type including a first tape edge reference surface against which a first tape edge abuts, a tape backing member having a dimension backing the tape width exclusive of an unsupported region adjacent the second tape edge wherein the improvement comprises a spring biased mass, said mass having a first segment bearing against the second tape edge towards said reference surface, and a fulcrum upon which a second segment of said mass, diametrically opposite the first segment, is pivoted for allowing said first mass segment to contact the unsupported second tape edge where said tape is wrapped about the guide.

* * * * *